(12) United States Patent
Devaux et al.

(10) Patent No.: US 7,187,869 B2
(45) Date of Patent: Mar. 6, 2007

(54) METHOD FOR ADJUSTING TIME DELAYS AND DEVICE FOR SYNCHRONIZATION OF CHANNELS IN A WDM SYSTEM

(75) Inventors: Fabrice Devaux, Montrouge (FR); Patrick Brindel, Longpont s/Orge (FR); Jean-Claude Jacquinot, Le Kremlin Bicetre (FR)

(73) Assignee: Alcatel, Paris (FR)

( * ) Notice: Subject to any disclaimer, the term of this patent is extended or adjusted under 35 U.S.C. 154(b) by 803 days.

(21) Appl. No.: 10/028,919

(22) Filed: Dec. 28, 2001

(65) Prior Publication Data

US 2002/0097464 A1 Jul. 25, 2002

(30) Foreign Application Priority Data

Jan. 25, 2001 (EP) ................... 01440015

(51) Int. Cl.
*H04B 10/00* (2006.01)
*H04J 14/02* (2006.01)

(52) U.S. Cl. .......................... 398/154; 398/161; 398/97

(58) Field of Classification Search .................. 398/81, 398/154, 155, 175, 177, 39, 173, 97, 161
See application file for complete search history.

(56) References Cited

U.S. PATENT DOCUMENTS

| 5,513,030 | A | | 4/1996 | Epworth |
| 5,612,807 | A | * | 3/1997 | Ishikawa et al. ............... 398/81 |
| 5,809,184 | A | * | 9/1998 | Doerr et al. ................... 385/11 |
| 6,016,374 | A | * | 1/2000 | Adams et al. ................ 385/24 |
| 6,137,610 | A | | 10/2000 | Patrick |

FOREIGN PATENT DOCUMENTS

| EP | 0936773 A1 | 8/1999 |
| FR | 2706710 | 12/1994 |

OTHER PUBLICATIONS

Sangsiri T et al: "Bit Synchronization Using Subcarriers for Control Signaling", IEEE Photonics Technology Letters, IEEE Inc. May 1999, pp. 602-604, vol. 11, No. 5, New York, US.
Leclerc O et al: "All-Optical Regenerators" May 7-12, 2000; pp. 133-135, vol. 39, 2000, New York, NY: IEEE, US.
O. Leclerc et al., "Simultaneously regenerated 4x40 Gbit/s dense WDM transmission over 10,000 km using a single 40 GHz InP Mach Zehnder Modulator", vol. 36, No. 18.

* cited by examiner

*Primary Examiner*—Jason Chan
*Assistant Examiner*—Quan-Zhen Wang
(74) *Attorney, Agent, or Firm*—Sughrue Mion, PLLC

(57) ABSTRACT

The invention is also related to devices for a synchronization of data in an optical WDM transmission system, consisting of the following parts: A wavelength demultiplexer (1) for demultiplexing the incoming data stream in the synchronizer, delay lines (2) for the individual wavelength channels, a multiplexer (10), a modulator (3) modulated by a high frequency clock signal (5) and at least one photodetector (4) tapped to output line (B) where the photodetector (4) is connected to an electronic control circuit (6) which is connected to the findividual delay lines (2) for an automatic delay control.

2 Claims, 2 Drawing Sheets

METHOD FOR ADJUSTING TIME DELAYS AND DEVICE FOR SYNCHRONIZATION OF CHANNELS IN A WDM SYSTEM

BACKGROUND OF THE INVENTION

The invention is based on a priority application DE 01440015 that is hereby incorporated by reference.

The invention is related to a method for adjusting time delays between at least two channels in an optical WDM (wavelength division multiplex) transmission system comprising the following steps:

Demultiplexing the signals, delaying the signals individually between channels and multiplexing the signals again for the next step (Block 1)

remodulating the multiplexed signal with a clock signal of high frequency (Block 2)

monitoring the remodulated signal with a low frequency photodetector unit (Block 3)

measuring, analyzing the photocurrent of the photodetector, adjusting via an electronic circuit the time delays between the channels (Block 4).

The invention is also related to devices for the synchronization of data in an optical WDM transmission system, consisting of the following parts: A wavelength demultiplexer (1) for demultiplexing the incoming data stream in the synchronizer, delay lines (2) for the individual wavelength channels, a multiplexer (100, a modulator (3) modulated by high frequency clock signal (5) and at least one photodetector (4) tapped to output line (B) where the photodetector (4) is connected to an electronic control circuit (6) which is connected to the individual delay lines (2) for an automatic adaption.

Wavelength division multiplex transmission systems allows to transmit a high data rate at several wavelengths of a definite wavelength grid. The transmission over large transmission distances occurs the problem of degradation of signals power, signals shapes and signal position in relation to the clock signal.

To overcome these problems the signals must be regenerated during the transmission. The invention is related to the regeneration issue of signals and especially for the position recovery of the signals in the digital bit stream.

Regeneration of WDM signals has been demonstrated in a solution-based regenerator up to 4×40 Gb/s in the publication "Simultaneously regenerated 4×40 Gbit/s dense WDM transmission over 10,000 km using a single 40 GHz InP Mach Zehnder modulator", O. Leclerc et al, Elect. Letters; Vol. 36, n° 18. This prior art shows a synchronization of the four channels of different wavelengths. For the remodulation of the signals the signals are multiplexed and fed in a Mach Zehnder modulator driven by a clock signal that was extracted from an individual wavelength channel. Optical delay lines are inserts for the individual wavelength to insure that the pulse signals of the four channels remain time coincident in the modulator. The delay lines are adapted manually to optimize the performance of the transmission system.

The arrangement in the prior art document shows a laboratory solution. For a practically solution in a regeneration tool of a transmission system an automatically synchronization in the time domain between several wavelength channels is necessary.

It is also known from prior art to synchronize a bit stream signals with help of a clock signal. In the French Patent 2,706,710 a method is described for an automatically synchronization of a single signal by using an electrooptical absorption modulator and a signal derived from the modulator itself. This method can only be applied using an electro-optical absorption modulator and only for one optical channel.

DESCRIPTION

The inventional method has the advantage that the time delays are adjusted automatically. The tuning speed depends mainly on the low frequency cut-off of the photodiode and the time response of the optical time delay.

The inventional method and the inventional device can use any type of modulator in block 2, Mach-Zehnder or electroabsorption, InP or $LiNbO_3$ based.

It is also an advantage of the device that the block 3 could be easily implemented when using an AWG (Arrayed Waveguide Grating) integrated with photodiodes array. The whole power consumption remains very low even when a great number of channel are simultaneously regenerated. This is due to the fact that only one RF clock recovery is required.

Low cost electronic control due to the low frequency electronic response of the required components allows a cost reduced solution for the synchronization tool.

It is an advantage to use a device where only a part of the signals is analyzed. Then it is possible to adjust independently each wavelength without degrading to hardly the transmission quality when varying largely the optical delay line.

BRIEF DESCRIPTION OF THE DRAWINGS

Preferred embodiment of the inventional solution are shown in the figures and described in the following description.

FIG. 1 shows the principles of the inventional device. The incoming signal is connected to a demultiplexer 1. The output lines of the wavelength demultiplexer 1 are individually connected with adjustable delay lines 2 and with a multiplexer 10. This part of the device is arranged in block 1 of the synchronizer. The output signal A is fed in a modulator 3. The modulator is connected with a clock recovery circuit 5. This clock recovery circuit is tapped to one or more of the demultiplexed and time delayed wavelength channels. After the modulator a photodetector 4 is placed. This photodetector is a low-frequency photodiode that is connected to an electronic control circuit 6. The electronic control circuit 6 is connected to the individual delay lines 2.

The principal solution is: when the RF signal applied on the modulator by the clock recovery circuit 5 and the optical pulses of the one signal are synchronous, the photocurrent of the photodetector 4 has its maximum. On the contrary when the optical pulses are phase shifted by 180°, the attenuation is maximum and the detected current is minimum.

This example is explained in the FR 2 706 710 which is incorporated by reference.

Figure 1:
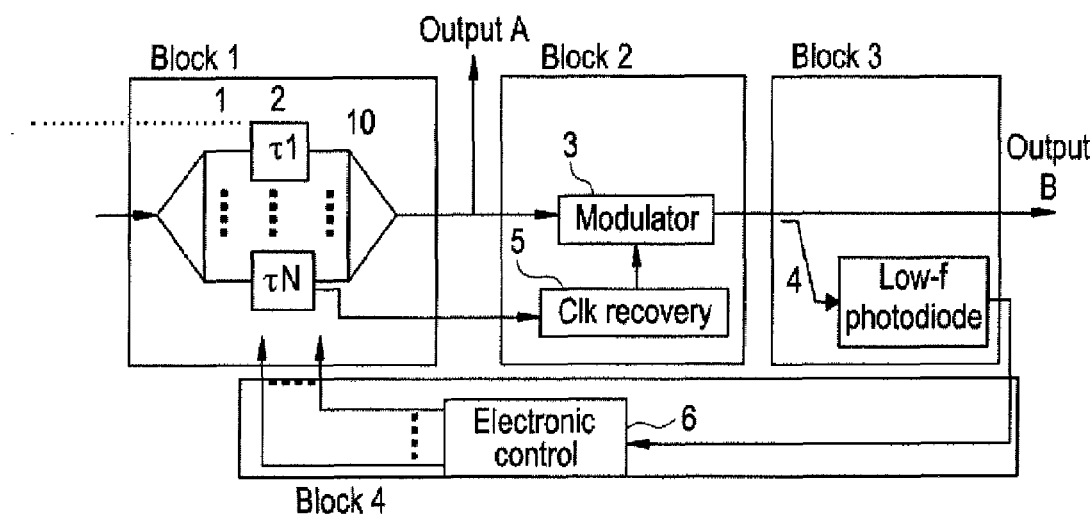
FIG. 1 shows a schematic solution for a synchronization device

In the first block of FIG. 1, N WDM channels are demultiplexed to allow adjustment of the independently and then re-multiplexed. At this stage a synchronized WDM signal can be used in output A. In the second block, the modulator is driven y an RF signal synchronized with any of the WDM channels (they all operate with the same bit rate) by detecting of the optical signal is extracted by a coupler and detected by a low-frequency photodiode. In a fourth block the detected signal is used by an electronic circuit to control the N time delays of block 1. By using the output B, the scheme of FIG. 1 is also the main part of a soliton-based regenerator, which also contains amplifiers and pulse reshaping means.

In a WDM context, the photocurrent variation is similar whatever the time shift of the other channels. Each WDM channel can thus be adjusted in sequence or with various dithering frequencies. The photocurrent variation amplitude is however decreasing with the number of channels.

The mean detected photocurrent is the sum of N independent contributions, each depending on the time shift between the RF signal applied on the modulator and the time arrival of the pulse in the modulator. The electronic control circuit typically varies sequentially each optical time delay $\tau_i$ to maximize the mean photodetected current. Only one sequence is necessary to find the optimum value corresponding to the synchronization of every channel. Alternatively a dithering technique can be used by attributing a control frequency to each channel.

As the number of WDM channels increases, however, the current variations decrease. Let us call p the linear extinction ratio of the modulator, for instance $\rho=0.25$ for 6 dB extinction ratio. In a single channel configuration, the photocurrent variation when varying the time shift is $i_{max}/i_{min}=1/\rho$. In a WDM configuration, the photocurrent variation for a given channel depends on the synchronization of the other channels. In the worst case, $i_{max}/i_{min}=1-1/N+1/(\rho N)$. Numerically for 1, 2, 4 or 16 channels, the photocurrent variations are 6 dB, 4 dB, 2.4 dB or 0.75 dB successively. As such small variations may be difficult to detect, a WDM demultiplexer may be added to a first embodiment of the invention to control each channel independently, as shown below in FIG. 2.

Figure 2:
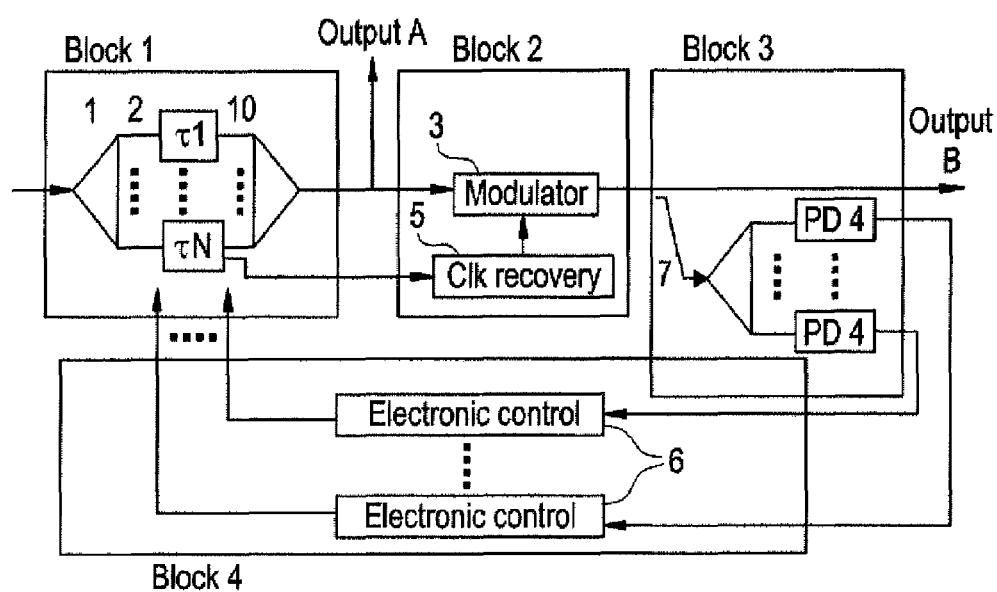
FIG. 2 shows a first embodiment of the synchronization device

FIG. 2 contains the same single components as described in FIG. 1. Additionally to the basic solution in the third block a second demultiplexer 7 is integrated. This demultiplexer demultiplexes the tapped part of the remodulated signal. In each demultiplexed channel a single photodetector is built in. This structure: a demultiplexer demultiplexing several different wavelengths in different lines and a photodiode device in each line can be realized in AWG structure in a optical integrated module.

It might be possible that the signal power of the tapped signal is too low for an analysis of the multiplexed signals. This is due to the fact that the modulator remodulates a signal that has the problem to contain time shifted signals and than only a part of the signals is coupled into the photodiode. The modulator arises insertion losses for the signals.

To alleviate the optical modulator insertion loss concatenated with the coupler withdrawing just a small part of the WDM multiplex, a second embodiment is proposed.

Figure 3:
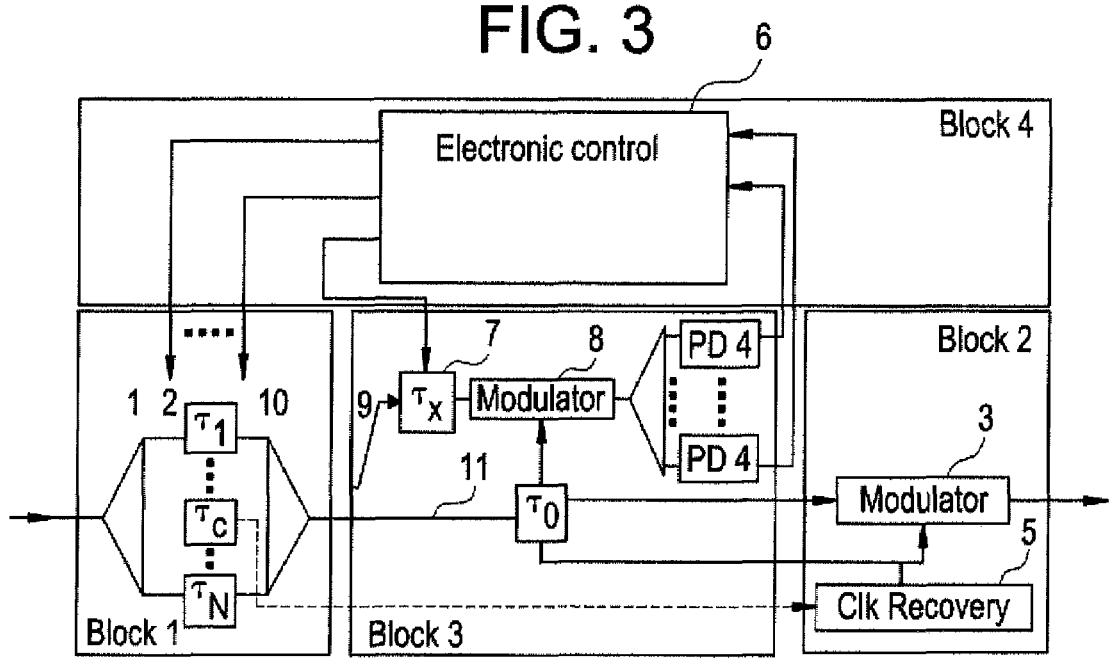
FIG. 3 shows an advanced embodiment of synchronization device

FIG. 3 shows this embodiment. In this embodiment the block 3 functions follows the block one functions first and than the remodulating functions of block 2 are connected. The multiplexed signal A is tapped to a second delay line 9. After this second delay line a second modulator 8 is connected to the demultiplexer 7 and the photodetectors 4. The main signal is fed into the modulator 3. The clock recovery circuit is driving both modulators 8 and 3 with a fixed delay 11 between.

A small part of the WDM multiplex is sampled just before the modulator 3. On this derivation the second modulator 8 is inserted between an optical delay line $\tau_x$, which delays the whole multiplex, and the WDM demultiplexer 7. The modulator is also controlled by the same RF clock provided by $\lambda_c$. The RF time delay between the RF driving of the two modulators is fixed and $\lambda_c$ is synchronized with modulator 3 for example by construction.

In another embodiment the modulator 3 is been time synchronized with the modulator 8 also by adjusting the "out of line" optical delay line $\tau_x$. If the wavelength $\lambda_c$ controlling the RF clock signal is synchronously modulated on both modulators 3 and 8 then the out-of-line measure of $\tau_x$ will be the reference value (as a zeroing functionality). All the other wavelengths will be slaved to this initial measurement, first by adjusting for each channel the optical delay $\tau_x$. maximizing the per-wavelength detected photocurrent, then measuring the difference versus the reference and only after applying this difference to the in-line per-wavelength dedicated optical delay line $\tau_i$.

Taken into account the "out-of-line" measurement technique functionality, it is possible to adjust independently each wavelength without degrading to hardly the transmission quality when varying largely the optical delay line.

Figure 4:
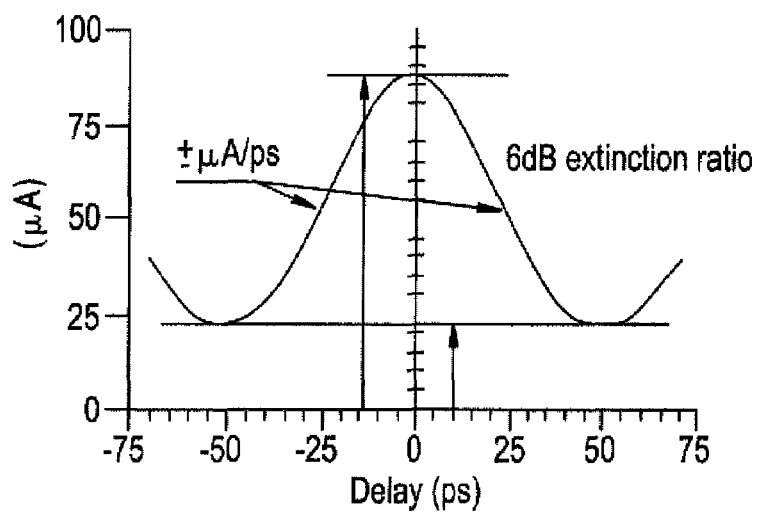
FIG. 4 shows the photocurrent over the delay time

As depicted on FIG. 4, the photocurrent evolution measured on a photodiode placed after an Electro-absorption modulator reaches its maximum sensitivity when the pulse center is delayed one quarter of the center time bit apart. The photocurrent evolution is symmetric and it seems easy to determine the optimum point electronically. In this experiment the bit-rate is 10 Gbit/s and the pulse width 32 ps which is also representative for a 40 Gbit/s regenerated transmission.

The controlling function of block 4 is known from prior art.

The embodiments described herein are examples for solutions of the invention. The invention is not restricted to the described embodiments. Each component can be used that a person skilled in the art can use to obtain the desired result. The device for synchronization of parallel data in a WDM data stream is not limited to a special modulation scheme. It works with RZ or NRZ modulate signals and can also be adapted to every other modulation scheme fitting for a WDM transmission. The synchronization device is also not limited for a use in a regeneration tool. It can also be used as a stand-alone device.

The synchronization device is used in a transmission system for WDM transmission. The device is than be used in combination with an amplification toll and a reshaping tool.

The invention claimed is:

1. A device for a synchronization of data in an optical WDM transmission system, comprising: a wavelength demultiplexer for demultiplexing the incoming data stream in the synchronizer, delay lines for the individual wavelength channels, a multiplexer for combining the data stream before the remodulation, a first modulator which modulates by a high frequency clock signal the multiplexed data stream, and at least one photodetector tapped to the output signal of the multiplexer, wherein the at least one photodetector is optically connected to at least a part of the multiplexed data stream and electronically connected to an electronic control circuit which is connected to the individual delay lines for an automatic adaptation, wherein a second demultiplexer is tapped to the output signal of the multiplexer connected to said at least one photodetector for each individual wavelength of the wavelength multiplex.

2. A device for a synchronization of data in an optical WDM transmission system, comprising: a wavelength demultiplexer for demultiplexing the incoming data stream in the synchronizer, delay lines for the individual wavelength channels, a multiplexer for combining the data stream before the remodulation, a first modulator which modulates by a high frequency clock signal the multiplexed data stream, and at least one photodetector tapped to the output signal of the multiplexer, wherein the at least one photodetector is optically connected to at least a part of the multiplexed data stream and electronically connected to an electronic control circuit which is connected to the individual delay lines for an automatic adaptation, wherein a part of the wavelength multiplex signals (A) is tapped and feed in a second modulator connected with at least one photodetector and driven by the same clock signals as the modulator.

* * * * *